United States Patent Office 2,997,431
Patented Aug. 22, 1961

2,997,431
METHOD OF INITIATING AND SUSTAINING AN ENERGETIC PLASMA FOR NEUTRON PRODUCTION
Persa R. Bell, Robert J. Mackin, Jr., and Albert Simon, Oak Ridge, Tenn., assignors to the United States of America as represented by the United States Atomic Energy Commission
Filed May 21, 1959, Ser. No. 814,939
4 Claims. (Cl. 204—154.2)

This invention relates to a method of fueling of plasma-neutron producing devices such as disclosed in our co-pending application, Serial No. 753,846, now Patent No. 2,969,308, issued January 24, 1961, filed August 7, 1958, and the instant application is a continuation-in-part of this co-pending application.

The device set forth in FIGURE 1 of the above application which is also described as part of the instant invention operates generally as follows. Magnetic mirror coils are provided which provide a temporary magnetically-confined subvolume region in an evacuated housing, said coils at startup having, for example, about one-fifth their normal operating values. A plasma is then initiated within this region by, for example, injecting high-energy molecular ions in an amount in excess of the critical input current for burnout into the temporary region into the path of an energetic arc discharge established between suitable electrodes, where a portion of the injected molecular ions are dissociated into atomic ions by the discharge, which ions are trapped by the magnetic field. The input current of the injected molecular ions is continued at this value until a sufficient number of neutrals are ionized so that a hot plasma is then formed. Immediately following the formation of the hot plasma, the magnetic fields in all regions including the temporary mirrors will be increased, say by a factor of about 5. Simultaneously, the arc is shut off, high-energy injection is discontinued and injection of cold particles by means to be specified later in the application is begun. "Cold particles" as used herein is fuel of a temperature below that for the first steady operation point, as defined later in this application. At the time cold particle injection is commenced the plasma temperature is well above the first steady operating point. The addition of sufficient "cold" particles causes the temperature of the plasma to fall. The injection preferably continues until the temperature falls to that corresponding to the optimum value for injection of cold fuel for a given machine. At that time the cold feed is adjusted to maintain this optimum temperature. After the subvolume is filled with a hot plasma, the reacting volume is gradually increased by proper manipulation of current in the magnetic coils surrounding the device, and the fuel feed controlled until the entire working volume of the device is filled with an energetic plasma. The feed is then increased until the plasma temperature is reduced to the first steady operating point. Finally, the feed is adjusted to provide fresh fuel only as rapidly as fuel is lost and burned.

The fueling of the device once a hot plasma has been established may be accomplished by high-energy injection of molecular ions instead of fueling by cold neutral particles, but in order to provide sufficient fuel to the device to reach and maintain a steady state condition, it would be necessary to provide a very large source of molecular ions and the accompanying accelerator, and the cost of operating such apparatus because of the power required to provide the necessary quantity of fuel would be excessive. Therefore, the use of cold particles will be preferred as a fuel for maintaining the device in a steady-state condition provided they can be heated within the device with adequate efficiency.

However, as pointed out in our co-pending application, aforementioned, there is a difficult problem associated with providing continuous feed of fuel into a plasma in order to sustain an energetic plasma for producing neutrons. This problem is particularly acute when injection of low energy or "cold" neutral fuel particles into the interior of a plasma is attempted. This problem is associated with the rate of ionization of the incoming atom. The mean life time $t$ of an atom in a plasma before ionization is:

$$t = \frac{1}{n\sigma v}$$

where:
$n =$ ion density
$v =$ ion velocity
$\sigma =$ ionization cross-section

The cross-section ($\sigma$) is about $10^{-16}$ cm.$^2$ for one such reactor, as disclosed in the aforementioned co-pending application, and $t$ then is equal to about $10^{-6}$ sec. This short life results in only limited penetration of the plasma, because low energy ions are unable to cross the magnetic field. For example, if the particles in the cold feed have energies of only a few electron-volts, they penetrate less than one centimeter. Only if their energy is $\gtrsim 1$ kev. will they penetrate in appreciable numbers to the center of the plasma (a distance of about 40 cm.). Thus, while it is eminently desirable to sustain an energetic plasma with cold particles to avoid the large costs associated with providing highly energetic ions, the plasma could not be sustained in that manner because cold atoms would be ionized before penetrating the plasma, and could not thereafter cross the magnetic field to penetrate the plasma. Hence they could not provide fuel for the central and most important region of the device.

With a knowledge of the problem of injection of cold neutral particles into the interior of a plasma, it is a primary object of this invention to provide a method for injection of cold fuel into a plasma at a rate and energy sufficient to sustain an energetic plasma for the production of neutrons.

It is another object of this invention to provide a method for injecting cold neutral particles at a selected angle to insure their entry into, and retention within, a plasma.

It is another object of this invention to provide a method for injecting cold ions into a plasma so that they constitute a fuel input which is adequate to maintain the desired neutron production rate at all points in the plasma.

It is another object of this invention to provide a method for injecting energetic ($\gtrsim 1$ kev.) neutral particles into a plasma so that they constitute a fuel input which is adequate to maintain the desired neutron production rate at all points in the plasma.

These and other objects and advantages will be apparent from a consideration of the following detailed specification and the accompanying drawings wherein.

One of the above objects has been accomplished in the present invention by for instance injecting "cold" neutral particles through one of the mirrors at an acute angle (with respect to the axis of the reactor) greater than the angle $\theta_c$ defined below, which is called the critical angle for containment. This critical angle $\theta_c$ is obtained from the relationship:

$$\sin^2 \theta_c = \frac{B_0}{B_1}$$

where:

$B_0$ = magnitude of uniform magnetic flux, and
$B_1$ = maximum value mirror magnetic flux Since $$\frac{B_1}{B_0} = R$$

the mirror ratio; then $$\sin \theta_0 = \sqrt{\frac{1}{R}}$$

Upon ionization, the injected particle is trapped between the mirrors and will move into the plasma along the field line which it is on. According to one method of our invention, the neutral atom trajectory angle is chosen as greater than the angle $\theta_c$ and the point of entry at such a point that the resulting ionized particles will enter the plasma along an interior field line through the plasma. Thus, the ionized particles penetrate into the interior of the plasma where they can be heated to energies necessary for the production of neutrons. The injector must be located sufficiently close to the mirror so that the ionization occurs inside the mirror and it might even be just inside of the mirror but radially outward from the plasma boundary. This may require injection energies well in excess of a few volts in order to prevent ionization before the particles penetrate to well inside the mirror. It may be aided, however, by making the mirror through which the fuel is injected very slightly stronger than the opposite mirror so that nearly all of the fuel lost from the reactor emerges from the far end.

Another method by which the above objects have been accomplished in the present invention is that of injecting cold ions through one of the mirrors along the desired field lines and relying upon scattering within the plasma to redirect their velocities so that they are spatially distributed and trapped between the mirrors. For instance, in a device such as that described in our co-pending application, a 1-ev. deuteron requires 6 milliseconds to travel its length, whereas the mean time for it to be scattered through 90° is only about 0.03 millisecond. Thus, nearly all of the injected ions will be scattered into trapped orbits instead of passing out of the machine.

Another method by which the above objects have been accomplished in the present invention is that of injecting neutral particles with energies greater than 1 kev. transverse to the axis. As has already been shown, these will have a mean penetration depth in the plasma comparable to the plasma radius, and thus will be deposited with reasonable uniformity throughout the plasma.

Another method by which the above objects may be accomplished in the present invention is a combination of the above methods tailored to optimize efficiency and fuel distribution.

Figure 1:
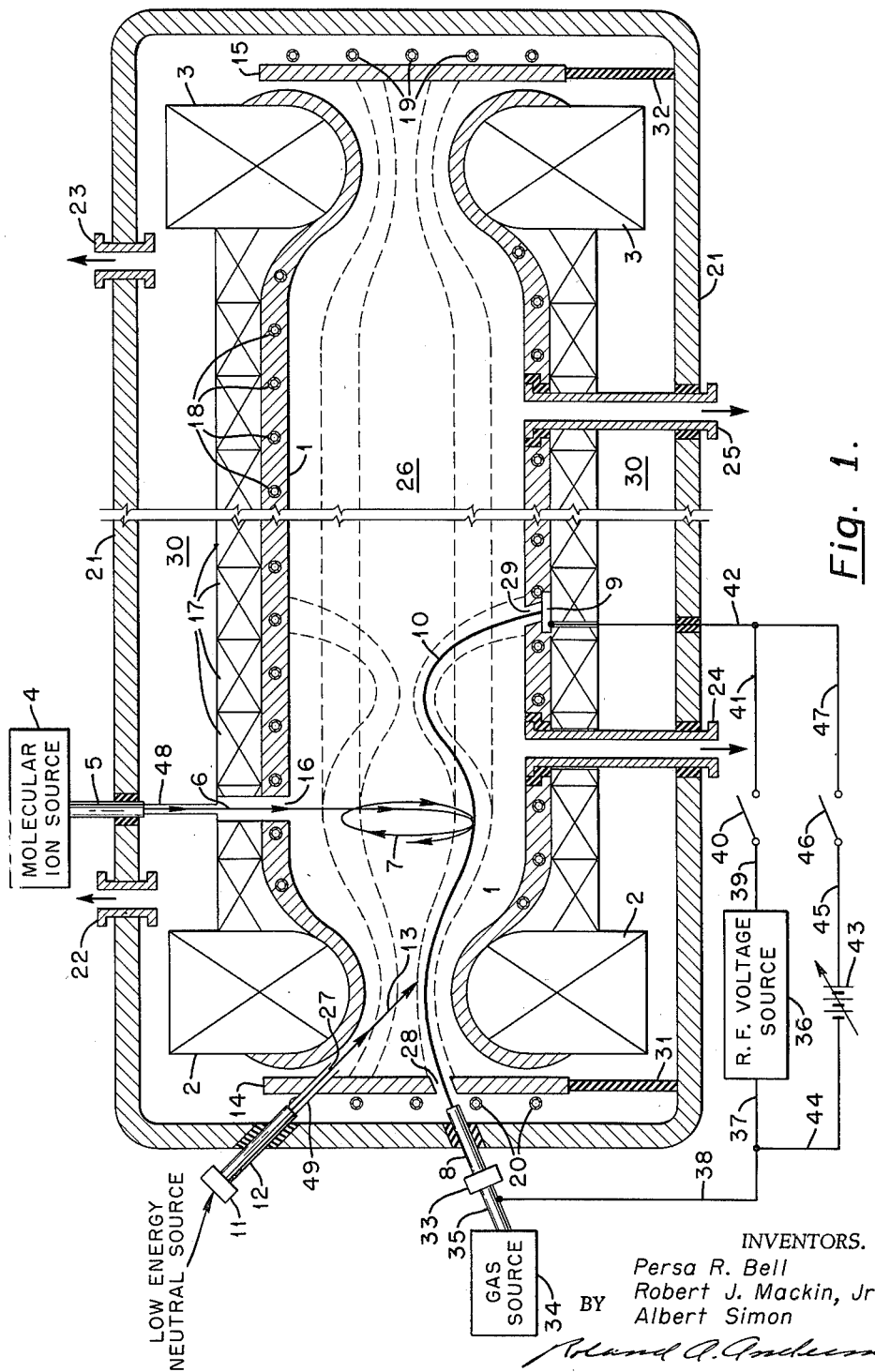
FIGURE 1 shows a cross-sectional view of a solenoidal mirror-type plasma-neutron producing device in which the principles of this invention may be carried out.

Referring now to FIGURE 1, there is shown a device identical to that shown in FIGURE 1 of the aforementioned co-pending application. A brief description of the device will now be given.

A cathode 8 is mounted in member 33 and an anode 9 is mounted in a breeding blanket 1. It may be desirable to place the anode at the extreme right end of the reactor, outside the permanent mirror and thus to run the arc over the entire length of the machine. Gas from a source 34 is fed through a tube 35 to the inside of cathode 8. An arc-initiating-assisting means such as a R.F. voltage source 36, which may be such as used in a conventional welding system, is connected at one side to cathode 8 by leads 37 and 38, and is connected at its other side to anode 9 by lead 39, switch 40, lead 41, and lead 42. An arc operating potential, such as a variable direct current source 43 is connected at one side to the cathode 8 by leads 44 and 38, and is connected at its other side to anode 9 by lead 45, switch 46, lead 47, and lead 42. An energetic arc discharge 10, which passes through opening 28 in end plate 14, opening 29 in breeding blanket 1, and follows the magnetic field lines as set up by the magnetic mirror coils as shown, may be initiated and sustained by apparatus such as disclosed in the applications of John S. Luce, Serial No. 738,242, filed May 27, 1958, now Patent No. 2,920,234, issued January 5, 1960, and Serial No. 748,771, filed July 15, 1958, now Patent No. 2,927,-232, issued March 1, 1960.

The chamber 26 is defined by the breeding blanket 1 which is surrounded by magnetic mirror coils 2 and 3 and by a plurality of solenoid coils 17 disposed in end-to-end relation between the mirror coils 2 and 3, and a pair of end plates 14 and 15 which are mounted by electrical insulators 31 and 32, respectively, to the outside chamber wall 21. The end plates are thus insulated so that they may become charged by ions and repel further ions back into the chamber 26, and so that a current may be drained therefrom to obtain electrical power directly. The solenoid coils 17 are also used to provide the temporary mirror regions. The chamber 26 is evacuated by vacuum pumps, not shown, through tubular members 24 and 25. An outer vacuum chamber 30 which encloses the vacuum chamber 26, is evacuated by vacuum pumps, not shown, through tubular members 22 and 23.

High energy molecular ions, for example $D_2^+$ of 600 kev. energy, are injected from a source 4, through an accelerator tube 5, through tube 48, and through an opening 16 in one of the solenoid coils 17 and the blanket 1, and then into the path of the energetic arc discharge 10, where a portion of them are dissociated to form a magnetically trapped circulating ring 7 of atomic ions in a manner set forth in the application of John S. Luce, Serial No. 728,754, filed April 15, 1958. Heat from the reactions that take place in the plasma within chamber 26 for producing neutrons and the nuclear reactions that take place in the breeding blanket 1 will be removed by circulating a pressurized liquid through tubes 18 disposed in the blanket 1, through tubes 20 disposed adjacent to the end plate 14, and through tubes 19 disposed adjacent to the end plate 15. This heat may be converted to electrical energy by employing a conventional heat cycle as set forth in our co-pending application, aforementioned.

The accelerator tube 5, referred to above, may be energized by a conventional high voltage generator. A suitable high current source of molecular ions from source 4 may be provided by apparatus such as set forth on page 18 of Nucleonics, vol. 9(3), 1951; Rev. Scientific Instruments, vol. 24, p. 394, 1953; or that described by Von Ardenne, "Tabellen der Elektronenphysik, Ionenphysik and Ubermikroskopie," Berlin, 1956 (Duo-Plasmatron), for example.

In order for a plasma to build up and become hot, the residual neutral atoms or particles in the device have to be destroyed and new neutral particles have to be destroyed as fast as they flood into the system. There is a critical value for the input current of the injected molecular ions at which the ions "burn out" or ionize the neutral particles as fast as they are flooding into the plasma. A detailed discussion of the "burnout" principle is set forth in our aforementioned co-pending application and in the application of Albert Simon, Serial No. 732,770, filed April 28, 1958.

Once burnout is achieved, high energy molecular injection is stopped and cold neutral particles are then injected at an angle greater than $\theta_c$ and as a beam 13 from a source 11, through a tube 12, which may constitute an ion accelerator, if it is desired to impart energy to the fuel, and through entrance conduit 49 and opening 27 in end wall 14 into the plasma region. Energetic neutral particles are produced by accelerating a beam of appropriate ions (DT), for example, through tube 12, and passing the beam through a thin foil or gas chamber at the exit end of tube 12 to produce neutral atoms of fuel in the form of a beam 13.

In a mirror type machine, such as illustrated in FIG-

URE 1, it is difficult to inject cold particles into the interior of a plasma due to the rapid ionization of a cold atom as discussed above. Since a cold ion is incapable of crossing the magnetic field, cold atoms injected from the side are prevented from reaching the plasma interior. We have found a solution to this problem. The cold fuel particles are injected through one of the mirrors at an acute angle (with respect to the axis) greater than the angle $\theta_c$ as discussed above.

The problem of tritium conservation in a D-T device requires that almost exactly one tritium atom can be produced for every neutron produced in a 50–50 DT mixture. It will, in fact, be desirable to breed extra tritium to the maximum extent possible. This would necessitate surrounding the reaction tube with the blanket 1 consisting mostly of lithium. In addition to the lithium, the blanket would consist of water, beryllium, and iron. The water is used to moderate the neutrons rapidly, while the beryllium produces extra neutrons by (n, 2n) reactions and by ($\alpha$, n) reactions. The iron is used to contain the lithium and water separately. The tritium thus produced in the blanket may then be recovered by conventional methods.

In one example of the apparatus of FIGURE 1, the reaction tube radius is 60 cm. The blanket thickness is 60 cm., the inner diameter of the coils 17 is 240 cm., the outer diameter of the coils 17 is 480 cm., and the length of the reaction chamber is 50 meters.

In the initial stage of operation of the apparatus of FIGURE 1 having the dimensions referred to above, a subvolume of the entire device is isolated magnetically by suitably energizing different sections of the coils 17. An additional temporary mirror is produced about one meter from the mirror 2 with a mirror ratio of 3.5 to 1. The sub-volume formed by the temporary mirror and the permanent mirror is then substantially equal in size to about $4 \times 10^4$ cm.$^3$; that is, a region substantially the same size as the plasma region described in the aforementioned Simon application. The entire field strength in this region is reduced to $\frac{1}{5}$ of its usual value. Thus, the field in the midplane of the subvolume is about 6 kilogauss on the axis and is about 21 kilogauss in the coils. The coil 2 may be made slightly stronger than coil 3 so that nearly all of the fuel lost from the reactor emerges from the far end formed by the mirror coil 3. The next section of field coils immediately following the temporary mirror is reversed in current direction. This is done in order to obtain some field lines which run up into the wall region as shown by dashed lines on the drawing.

A high-energy vacuum carbon arc or high-energy deuterium arc is now struck between the cathode 8 and the anode 9 in a manner as set forth in the aforementioned Luce applications. Once the arc has been struck, injection of molecular $D_2^+$ or DT ions at energies of about 600 kev. and a current of about one ampere or greater is begun by use of a cascade accelerator 5 as discussed above.

The initial pressure in the reaction chamber 26 is maintained at a value of about $10^{-6}$ mm. Hg. The injected molecular beam 6 is passed through the arc discharge 10 where a portion, for example, 25%, of the molecular ions are dissociated and are trapped by the magnetic field and form a circulating beam 7 of atomic ions.

The initial condition which must be attained is that of "burnout." The pressure is low enough and the trapped beam is large enough so that the neutral particles which are flooding into the active volume are ionized by ionization and charge exchange as fast as they enter. The neutral density inside the plasma drops and the plasma begins to build up thus burning out more neutrals. Hence, the system cleans out the neutrals in the plasma interior. An injected current of one ampere produces a "critical" input current of atomic ions greater than that required for burnout in the subvolume which is necessary for the neutrals to be destroyed. Once burnout has occurred in the sub-volume and an energetic neutron producing plasma has been achieved, the burnout condition will be maintained in the plasma interior. Simple calculations show that burnout will continue to exist as the subvolume is expanded to encompass the entire plasma volume. The achievement of burnout will be immediately followed by the formation of a hot plasma in the subvolume.

Immediately following the formation of the hot plasma, the magnetic fields in all regions (including the temporary mirror) will be increased by a factor of about 5. Thus, the end mirror and temporary mirror rise to about 105 kilogauss while the midplane field of the subvolume goes to about 30 kilogauss. Simultaneously, the arc is shut off, high-energy injection is discontinued, and injection of "cold" fuel particles of a 50–50 mixture of deuterium and tritium is begun by one or more of the methods described above.

In two of the methods described above, cold neutral particles are injected through the mirror region formed by the coil 2 at an angle greater than the critical angle for containment so that they enter the plasma on magnetic field lines passing through the plasma as discussed above or cold ions are injected along the same field lines.

Figure 2:
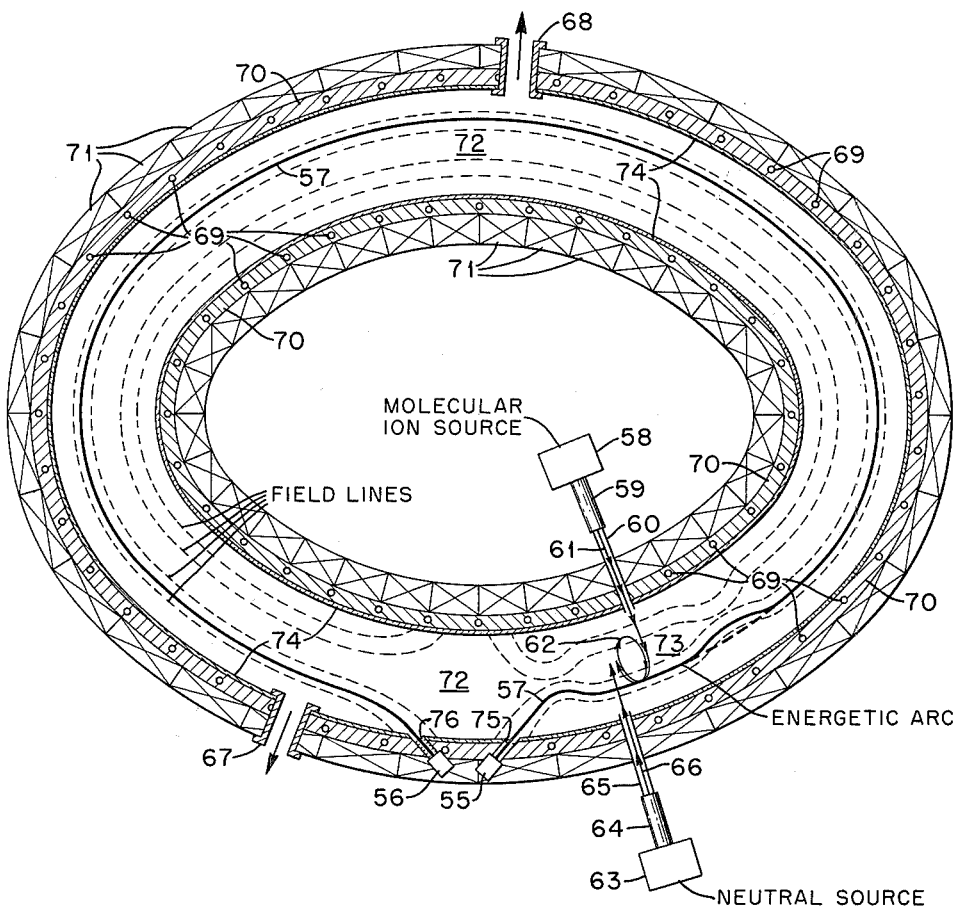
FIGURE 2 shows a cross-sectional view of a toroidal-type plasma-neutron producing device.

In the other method described above, cold neutral particles with energies greater than 1 kev. are injected transverse to the axis of the device and they will have a mean penetration depth in the plasma comparable to the plasma radius as discussed above. In this method, the neutral particles are injected from a source, not shown in FIGURE 1, into the plasma region and in a direction transverse to the axis of the device. Such a position for the source is shown in FIGURE 2, which will be described hereinafter, and it should be clear that such an arrangement may be used with the device of FIGURE 1 as a substitute for the low energy neutral source, or used in addition to the latter source.

The addition of sufficient "cold" fuel particles causes the temperature of the plasma to fall. The injection continues until the temperature falls to a value commensurate with maximum fuel injection rate (calculated as being about 78 kev.) for the device described above. At that time, the "cold" feed is adjusted to maintain the temperature at this optimum value. It should be noted that any impurities in the plasma that are due to the arc ignition technique will vanish rapidly after the arc is shut off and cold-fuel injection of deuterium and tritium gas is begun.

If the average energy of the plasma is above the first steady operating point and below the second steady operating point (between 60 kev. and 122 kev. for $P=0.15$), there is an intrinsic tendency for the plasma to heat itself up. On the other hand, if "cold" fuel is injected faster than it is being lost from the system, this has a tendency to depress the temperature of the plasma. By balancing these two effects, it is possible to maintain the average energy at a fixed level and to increase the total fuel in the volume steadily.

The term P, referred to above, is the probability of scattering into the escape cone, and is approximately equal to:

$$1 - \cos \theta_c, \text{ or } P \simeq 1 - \sqrt{1 - \frac{1}{R}}$$

For a mirror ratio of 3.5:1, which is the case for the apparatus illustrated in the drawing, $P=0.15$. The escape cone referred to above is that region in velocity space lying between the mirror axis and a surface forming an angle with the axis equal to the critical angle for containment.

The next step will then be the gradual motion of the temporary mirror to the right by selective adjustment of current to the solenoid coils 17, with a consequent filling of the entire working volume with a hot plasma. The final step is the reduction of the plasma temperature to the first steady operating point of about 60 kev.

Since the rate of feed of the neutral particles into the reactor is an important part of this invention, a discussion of the feed rate to maintain the above-mentioned balancing effect will now be given.

Assume that the magnetic pressure remains constant and that the plasma pressure also is kept fixed. In this case, the rate of change of the number of fuel particles in the plasma is:

$$\frac{d(nV)}{dt} = I - n^2\sigma_c vPV - 2n_D n_T \sigma_{DT} vV \quad (1)$$

Here $n$ denotes the total ion density ($n = n_D + n_T$), (the density of reaction products, He$^4$, in the plasma is assumed small), $\sigma_c$ is the "coulomb cross section" for 90-degree scattering by repeated small-angle collisions, and $v$ is the relative collision velocity. The injected particle current of ions is denoted by $I$, $V$ is the total volume of the plasma, and $P$ is the probability of scattering into the escape cone, as discussed above.

Similarly, the time rate of change of the energy of the system, $\bar{E}$, is given by the equation:

$$\frac{d(n\bar{E}V)}{dt} = Vn_D n_T \sigma_{DT} v[E_\alpha(1-P) - 2\bar{E}]$$

$$- Vn^2\sigma_c v P\bar{E} - P_{brems}V - \frac{4}{3}n\bar{E}\frac{dV}{dt} \quad (2)$$

where $E_\alpha (=3.5 \text{ mev.} + .4\bar{E})$ is the energy deposited in the gas by the He$^4$ reaction product, and $P_{brems}$ is the bremsstrahlung loss per unit volume. The last term on the right represents the work done against the magnetic field by the plasma. The pressure, on the assumption that the electron and ion temperatures are equal, is $\tfrac{2}{3}n\bar{E}$. At constant pressure, $n\bar{E}$=constant. Hence:

$$\frac{7}{3}n\bar{E}\frac{dV}{dt} = V[n_D n_T \sigma_{DT} vE_\alpha(1-P) - P_{brems}]$$

$$- [2n_D n_T \sigma_{DT} v + n^2\sigma_c vP]\bar{E}V$$

$$= \bar{E}V(f-1)(2n_D n_T \sigma_{DT} v + n^2\sigma_c vP)$$

where $$f = \frac{n_D n_T \sigma_{DT} v E_\alpha(1-P) - P_{brems}}{\bar{E}[2n_D n_T \sigma_{DT} v + n^2\sigma_c vP]} \quad (3)$$

The quantity $f$ is the ratio of the power deposited in the fuel minus the bremsstrahlung loss to the energy required to heat the fresh fuel injected at the steady state rate to the operating temperature. Thus for fixed pressure, the volume will increase with time if $f>1$ and decrease if $f<1$.

Of course, this result is dependent on the conditions being consistent with Equation 1. In particular, if we wish to keep both $n$ and $\bar{E}$ fixed, this requires that:

$$\frac{7}{3}n\bar{E}\frac{dV}{dt} = \frac{7}{3}\bar{E}(I - n^2\sigma_c vPV - 2n_D n_T \sigma_{DT} vV) \quad (4)$$

as follows from Equation 1 by multiplication by $\tfrac{7}{3}\bar{E}$.

On comparison of Equation 4 with Equation 3, this shows that:

$$\frac{I}{V} = \left[\frac{3}{7}(f-1) + 1\right](n^2\sigma_c vP + 2n_D n_T \sigma_{DT} v) \quad (5)$$

Hence, fuel must be fed in at a rate specified by Equation 5, which is greater than the loss rate if $f>1$, and smaller if $f<1$. In order to increase the plasma volume at the maximum possible rate, the reactor must operate at the peak of the $f$ function. This peak occurs at about $\bar{E}=78$ kev. for $P=0.15$ and has the value $f=1.3$.

The term $P_{brems}$ referred to above may be determined from the following equation:

$$P_{brems} = \frac{64e^6 z^3 n^2}{3\sqrt{2\pi}mc^3 \hbar}\sqrt{\frac{2\bar{E}}{3m}}$$

where:

$n$=total ion density=$n_D + n_T$
$m$=electron mass

It may be desirable and is within the scope of this invention to continue the discharge and injection of high energy molecular ions until the entire working volume of the device is filled with a hot plasma before cold particle feed is substituted for the high energy molecular ion feed and use of the arc discharge.

Of the principles of this invention as set forth above, only the transverse injection of $\geq 1$ kev. neutral particles may be employed in a device which is toroidal in shape and to other types of devices that do not employ mirror fields. FIGURE 2 shows such a toroidal device which will now be described.

The device of FIGURE 2 may employ the use of the energetic arc for substantially the full length of the device although operation of a shorter arc in the manner of FIGURE 1 is also feasible. The arc is terminated after burnout followed by a magnetic field increase, and relatively low energy ($\geq 1$ kev.) fuel injection transverse to the axis of the device is used to feed the plasma after burnout, in the same manner as set forth in one method of operation of FIGURE 1 above. The arc electrodes are positioned in a region of widely diverging magnetic fields (a temporary condition) so that the field lines intersect the walls of the tube. A temporary mirror region is established, as shown in FIGURE 1, near the diverging region to form a static mirror region. In addition, a moveable mirror region is established, as shown. A small plasma is initiated by means described above for FIGURE 1, in the subvolume between the static mirror and the moveable mirror. When "burnout" conditions have been achieved and the subvolume filled, the magnetic field is increased to the value necessary for the containment of the energetic plasma, the arc is extinguished, cool fuel injection is substituted for the high energy molecular injection, and the moveable mirror is progressively moved away from the static mirror until it eventually is beside the opposite side of the diverging region. At this point, the field in the diverging region is returned to normal, and both of the mirror fields are removed. Alternatively, the field in the diverging region may be returned to normal when the arc is extinguished.

In FIGURE 2, a cathode electrode 55 is insulatingly mounted in a space in one of the solenoid coils 71, and anode electrode 56 is insulatingly mounted in one of the solenoid coils 71. These electrodes are so positioned that the arc discharge 57 which is initiated between them passes through holes 75 and 76 in the blanket 70 and reaction tube 74 and then follows the magnetic field lines as shown by the dashed lines in the figure.

The reaction chamber 72 is formed by the tubular member 74 shaped in the form of a toroid as shown. This tube is surrounded by the solenoid coils 71. Additional coils, not shown, are provided to establish a system of transverse magnetic fields perpendicular to the axial confining field, to insure stability of the plasma. The direction of these transverse fields rotates with axial distance around the torus. A helical confining field is a simple form of such transverse field, for example.

Heat from the energetic plasma and the reactions that take place in the blanket 70 is removed by pressurized fluid which is circulated through tubes 69 mounted in the blanket 70. This heat is then converted into electrical energy in the same manner as set forth for FIGURE 1 above. The tube is evacuated by vacuum pumps, not shown, through tubular members 67 and 68. Proper energization of the solenoid coils 71 provides the diverging magnetic fields and the temporary mirror fields as shown on the drawing. High energy molecular ions are injected into subvolume 73 from a source 58, through tube 60 in the form of a beam 61 which beam passes through arc discharge 57 where a portion of them are dissociated to form a magnetically trapped circulating beam of atomic ions 62. When burnout has been achieved, injection of high energy molecular ions may be stopped and injection of cold neutral fuel then started. This cold fuel is injected as a beam 66 of energy $\cong 1$ kev. in a direction transverse to the axis of the device from a source 63, through tube 64, and then through tube 65, as shown. The toroid is then filled with an energetic, neutron producing plasma in a manner indicated above. The beam 66 may be directed into the plasma at any desired angle provided it is directed toward the axis of the device.

Since the instant invention deals primarily with fueling of devices for producing energetic plasmas for the production of neutrons, it is not considered that a more detailed discussion of the operating characteristics of the devices shown is necessary, and reference is made to our aforementioned copending application for a more complete discussion of the devices.

This invention has been described by way of illustration rather than limitation and it should be apparent that the invention is equally applicable in fields other than those specified.

What is claimed is:

1. In a method of initiating and sustaining an energetic plasma for the production of neutrons in a chamber surrounded by a plurality of electromagnetic coils in end-to-end relation including the steps of evacuating said chamber to a pressure of about $10^{-6}$ mm. Hg; selectively energizing some of said coils to establish a containing magnetic field in a small portion of said chamber to form a magnetically contained sub-volume consisting of two magnetic mirror regions spaced apart axially with a uniform magnetic field region therebetween, the magnetic field strength in said mirror region being about 21 kilogauss and in said uniform region being about 6 kilogauss; initiating an energetic arc discharge between two electrodes, said discharge passing through said subvolume along the containing magnetic field lines; injecting a one ampere current of molecular ions having an energy of 600 kev. into the path of said discharge where a portion of said molecular ions are dissociated and/or ionized to form atomic ions which are magnetically trapped by said containing magnetic field to form a plasma within said subvolume, said current of molecular ions being greater than that required for producing a current of atomic ions sufficient to achieve burnout of neutral particles in said subvolume; increasing the magnetic field strengths of said mirror regions and said uniform region after said plasma is formed to values at least five times larger than said first field strengths; terminating said arc discharge; and periodically, step-by-step increasing the length of said subvolume, each said step comprising decreasing the current flow through the coil forming one of said mirror regions to return said one region to said uniform field strength, and simultaneously increasing the current flow through the next adjacent coil to thereby establish a mirror region in alignment with said next adjacent coil until said subvolume has been expanded to encompass the entire reaction chamber which is then filled with an energetic, neutron producing plasma; the improvement comprising the subsequent steps of: establishing a beam of relatively cold neutral particles of a selected current and an energy of at least 1 kev.; simultaneously terminating said injection of said high energy molecular beam and directing said beam of neutral particles radially into said chamber and transverse to the uniform magnetic field and axis of said chamber, and adjusting said current of neutral particles to deposit in the plasma within said chamber an amount of fuel needed to sustain a steady state reaction temperature of about 60 kev.

2. The method set forth in claim 1, wherein said chamber is in the shape of a longitudinal, elongated cylinder.

3. The method set forth in claim 1, wherein said chamber is in the shape of a toroid.

4. The method set forth in claim 1, wherein the steps of terminating said molecular ion current and of injection of said neutral particles are performed prior to the magnetic expansion of said subvolume to encompass the entire reaction chamber, and including the steps of adjusting the current of said neutral particles to a first value to provide and maintain a reaction temperature of about 78 kev. while the subvolume is being expanded, and adjusting said current of neutral particles to a second value to provide and maintain said study state reaction temperature after said expansion is completed.

References Cited in the file of this patent

ORNL–2457. The ORNL Thermonuclear Program. January 15, 1958. U.S. Atomic Energy Commission, Technical Information Service Extension, Oak Ridge, Tennessee. Pages VII, 3–15, 39–50.

Atomic Industry Reporter, News and Analysis. Official Text, Section 1958, Library No. TK 9001 A7. Issue of January 29, 1958. Pages 54:5–54:11, Project Sherwood Amasa S. Bishop. Addison-Wesley Pub. Co., Reading, Mass., September 1958. Pages 132–138.